Patented Sept. 18, 1923.

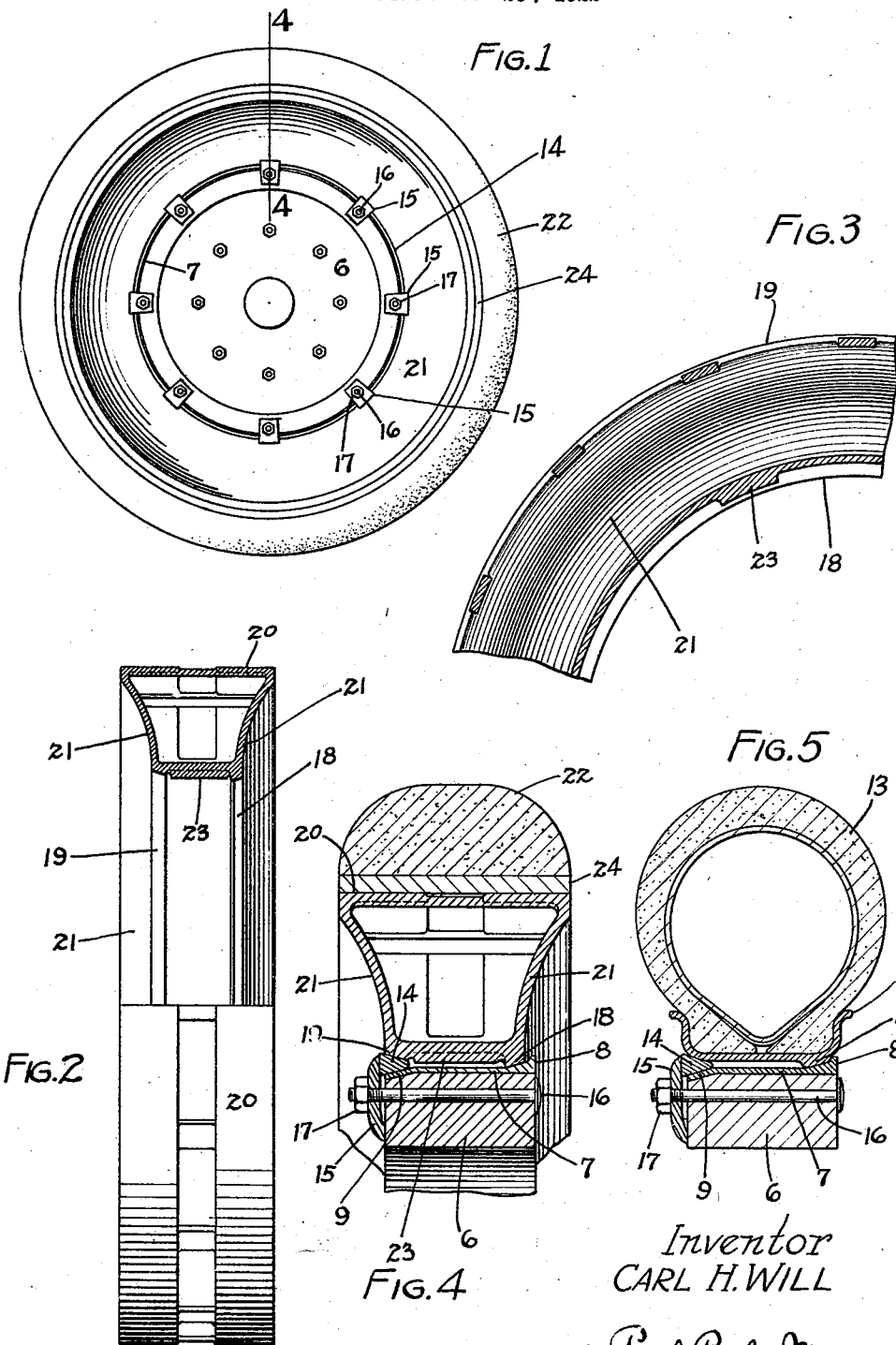

1,468,221

UNITED STATES PATENT OFFICE.

CARL H. WILL, OF MINNEAPOLIS, MINNESOTA, ASSIGNOR OF ONE-THIRD TO HARRY E. WILCOX AND ONE-THIRD TO RALPH D. WILCOX, BOTH OF MINNEAPOLIS, MINNESOTA.

TIRE ADAPTER.

Application filed December 26, 1922. Serial No. 608,952.

*To all whom it may concern:*

Be it known that I, CARL H. WILL, a citizen of the United States, resident of Minneapolis, county of Hennepin, and State of Minnesota, have invented certain new and useful Improvements in Tire Adapters, of which the following is a specification.

This invention relates to new and useful improvements in means permitting the substitution and interchange of a tire of the so-called solid type for a tire of the pneumatic type upon the same vehicle wheel or wheels.

This invention is more particularly adapted for use with the wheels of motor vehicles such as trucks. While the commonly used large pneumatic tires have many advantages under normal road conditions they are liable to destructive injury under certain conditions which made advisable the temporary use of what are known as solid rubber tires; such, for example, as travel over roads out of repair or deeply rutted, or ruts due to seasonal conditions of snow and ice. Under such unfavorable conditions, it has been a frequent occurrence to take off the pneumatic tired wheels and to replace them with wheels having solid tires. Such interchange not only necessitates purchase of a full set of complete solid tired wheels but also the expenditure of a relatively large amount of time and labor for the substitution. Further, the wheels having solid tires are usually heavier than the wheels with pneumatic tires.

This novel invention comprehends the employment of a device to which may be fixedly secured a solid tire—this term solid being employed in a generic sense as opposed to pneumatic. This device having its solid tire is adapted readily to be demountably secured to the fixed rim of a vehicle wheel only upon removal of the pneumatic tire and its usual demountable rim. The term fixed rim is herein employed to refer to that portion of a vehicle wheel, whether integral or not, which is adapted to co-operate with the usual demountable rim. Furthermore, the device or adapter, as it is termed, is preferably so proportioned that the tread circumference of its solid tire is equal to that of the pneumatic tire with which it is interchangeable. Such proportioning is advantageous, if not necessary, in order to avoid change of gear ratios of the driving wheels of motor vehicles. When the adapter is made of a hollow metallic casting, as here shown, the weight of the adapter and its tire is less than the weight of a pneumatic tire and its rim which the given adapter is designed to replace.

The object therefore of this invention is to provide a tire adapter for vehicle wheels.

Other objects of the invention will more fully appear from the following description and the accompanying drawings and will be pointed out in the annexed claims.

In the drawings, there has been disclosed a structure designed to carry out the objects of the invention but it is to be understood that the invention is not confined to the exact features shown as various changes may be made within the scope of the claims which follow.

In the drawings:

Figure 1 is a view in side elevation of a common form of vehicle wheel of the demountable rim type but having the novel adapter applied thereto;

Figure 2 is a composite view of the adapter without its tire, the upper half being in vertical section, while the lower half is a view in side elevation of the outer periphery of the adapter;

Figure 3 is a sectional view of a portion of the adapter taken in a radial plane;

Figure 4 is a vertical sectional view of the adapter and a portion of the wheel taken on the line 4—4 of Figure 1; and Figure 5 is a view similar to that of Figure 4 but showing the usual pneumatic tire on the wheel portion.

In the selected embodiment of the invention here shown, there is illustrated a common form of vehicle wheel 6 to the periphery of which is secured, as is usual, the fixed rim 7. Such fixed rim 7 is shown as having the inner annular shoulder 8 and outer annular inclined face 9. As is shown in Figure 5, the shoulder 8 receives the inwardly present annular rib 11 of a demountable rim 12. The parts shown in Figure 5 are all in common use at present. The demountable rim 12 is adapted to carry a pneumatic tire 13 and the rim 12, in accordance with common practice is demountably held in operative position upon the fixed rim by means of the ring 14 and lugs 15 held upon the bolts 16 by the nuts 17.

This novel invention provides a member, to which may be peripherally secured a solid tire, adapted to be demountably carried by the fixed rim 7 interchangeably with the demountable rim 12 and its pneumatic tire. Pneumatic tires, as is well known to those skilled in this art, are usually necessarily very large and accordingly are placed upon wheels of comparatively small diameter. If a solid tire were substituted for the pneumatic tire the former would have to be impractically large in order to maintain the tread circumference and also to fit the wheel periphery; or, else, a new set of wheels would have to be substituted. Hence, this novel adapter has an inner portion shaped to be demountably secured to the usual fixed rim and radially extends so that a practical and usual solid tire may be peripherally secured thereto which will maintain the same tread circumference and hence not alter the gear ratio of the driving wheels. The adapter member in the preferred form here shown comprises a metallic hollow casting having an inner portion presenting an annular rib 18 to engage the complementary rib 8 of the usual fixed rim and also an annular abutment 19 presenting an inclined face to the usual locking ring 14 of the vehicle wheel. The adapter member provided with its cushion or solid tire constituting a part thereof may be demountably held in operative position by means of this ring and its lugs 15 and nuts 17. The inner portion of the adapter casting is provided with a form of driving lug 23 which is engageable with the usual recess provided for that purpose in the fixed rim to prevent in this instance creeping of the adapter on the fixed rim of the wheel.

The outer peripheral portion 20 of the adapter member is of greater width than its inner portion and is integrally joined to the inner portion by the spaced outwardly flaring annular walls 21. A solid tire 22 may be secured in any usual manner to the periphery of the adapter member and, of course, may be of the solid or semi-solid cushion type. The solid tire and adapter member are preferably proportioned to preserve the tread circumference. The preferred method of securing a solid tire is to employ the present commercial form of solid tire 22 having a steel base 24. This steel base 24 may be pressed upon the outer portion 19 of the adapter.

I claim as my invention:

1. An adapter for conversion of a pneumatic-tired truck wheel of standard make, having a fixed rim formed to receive a pneumatic tire together with its demountable rim, into a cushion-tired truck wheel, consisting of a member having inner, outer and side walls, said outer wall being provided with a cushion tread, the inner wall being of a diameter to receive the fixed rim of a standard pneumatic-tired truck wheel, the radius of the member and peripheral tread constituting the adapter being substantially the same as the radius of the pneumatic tire and demountable rim it replaces so that the member and its cushion tire may have substantially the same tread circumference as the replaced pneumatic tire and demountable rim, without alteration in the gear ratio of the driving wheels.

2. An adapter for conversion of a pneumatic-tired truck wheel of standard make, having a fixed rim, formed on one side with an annular rib and on the other side with an inclined abutment for a locking ring, into a non-pneumatic tread wheel, consisting of a member having inner, outer and side walls, said outer wall being provided with a peripheral non-pneumatic tread, the inner wall being provided on one side with an annular rib to engage the rib on the fixed rim and on the other side formed with a bearing for a locking ring, and the inner wall being of a diameter to receive the fixed rim of a standard pneumatic-tired truck wheel, the radius of the member and peripheral tread constituting the adapter being substantially the same as the radius of the pneumatic tire and demountable rim it replaces so that the member and its peripheral tread may have substantially the same tread circumference as the replaced pneumatic tire and demountable rim, without alteration in the gear ratio of the driving wheels.

In witness whereof I have hereunto set my hand this 20th day of December, 1922.

CARL H. WILL.